(12) United States Patent
Gogo

(10) Patent No.: US 6,315,071 B1
(45) Date of Patent: Nov. 13, 2001

(54) REAR WHEEL SUPPORT DEVICE FOR A MOTORCYCLE

(75) Inventor: Kazuhiko Gogo, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/534,348

(22) Filed: Mar. 24, 2000

(30) Foreign Application Priority Data

Mar. 24, 1999 (JP) .................................................. 11-080530

(51) Int. Cl.[7] .................................................. B62D 61/02
(52) U.S. Cl. ........................... 180/219; 280/284; 280/288
(58) Field of Search .................... 180/219; 280/284–286, 280/288

(56) References Cited

U.S. PATENT DOCUMENTS

| | | | | |
|---|---|---|---|---|
| 4,540,062 | * | 9/1985 | Kashiwai | 180/227 |
| 4,592,596 | * | 6/1986 | Trautloff | 301/132 |
| 4,634,139 | * | 1/1987 | Watanabe et al. | 280/288 |
| 4,742,884 | * | 5/1988 | Ishikawa | 180/219 |
| 4,782,908 | * | 11/1988 | Trema | 180/227 |
| 4,810,039 | * | 3/1989 | Trema | 301/9 CN |
| 4,880,280 | * | 11/1989 | Panzica et al | 301/105 B |
| 5,531,289 | * | 7/1996 | Muramatsu | 180/227 |
| 5,782,313 | * | 7/1998 | Kurawaki et al. | 180/219 |
| 6,109,635 | * | 8/2000 | Maeda et al. | 280/279 |

FOREIGN PATENT DOCUMENTS 4325389  11/1992  (JP) .

* cited by examiner

Primary Examiner—J. J. Swann
Assistant Examiner—L. Lum
(74) Attorney, Agent, or Firm—Birch, Stewart, Kolasch & Birch, LLP

(57) ABSTRACT

Disclosed is a wheel support structure for a vehicle is provided having a swingarm operatively attached to the vehicle. An axle shaft is connected to the swingarm at essentially a distal end thereof; and a wheel rotatably supported via the axle shaft, the wheel having a wheel hub through which the axle shaft passes. The axle shaft is constituted by a head section and a base section, the head section having a cross-sectional thickness greater than a cross-sectional thickness of the base section.

3 Claims, 5 Drawing Sheets

REAR WHEEL SUPPORT DEVICE FOR A MOTORCYCLE

BACKGROUND OF THE INVENTION

1. FIELD OF THE INVENTION

The present invention relates to wheel support devices for motorcycles.

2. BACKGROUND ART

A rear support structure for a motorcycle is disclosed in Japanese Patent Laid-open No. Hei. 4-325389. As shown in FIGS. 1 and 4 of the above mentioned publication, this technology has an axle shaft 7 with an outer rim 3 formed at one end of a hollow shaft 2, and screw threads 9 formed on the other end. The axle shaft 7 is fixed between a rear fork 10 and fastened thereto by fixedly attaching and tightening a nut 9 onto the threads 9.

When, for example, a sprocket (not shown) is attached to an outer rim 3 side of the axle shaft 7, and this sprocket is driven by a chain, the outer rim 3 side is exposed to a large shearing force, as compared to the threaded side of the axle shaft 7. Moreover, when the sprocket is driven by a chain, the axle shaft 7 is subjected to bending in the driving direction thereof However, since the axle shaft 7 is fastened between a rear fork and set at a fixed width with the nut 8, if the axle shaft 7 is subjected to bending in the driving direction, the head section end is subjected to tensile force at the inner side.

As a result of the shear force in the vicinity of the outer rim 3, and a force in a direction so as to open the head section end towards the outside, both acting on a section of the axle shaft 7 continuous to the outer rim 3, there is a danger of cracks occurring in a base of the outer rim 3.

In order to prevent this cracking, the overall thickness of the hollow shaft 2 is increased, which in turn hinders attempts to manufacture a vehicle light in weight.

SUMMARY OF THE INVENTION

It is therefore an object of the present invention to provide a rear wheel support device for a motorcycle that possesses sufficient strength without drastically increasing the weight.

In order to achieve the above described object, a wheel support structure for a vehicle is provided having a swingarm operatively attached to the vehicle; an axle shaft connected to the swingarm at essentially a distal end thereof, and a wheel rotatably supported via the axle shaft, the wheel having a wheel hub through which the axle shaft passes, wherein the axle shaft is constituted by a head section and a base section, the head section having a cross-sectional thickness greater than a cross-sectional thickness of the base section.

Thus, sufficient strength is ensured without drastically increasing the weight of an axle shaft, by making the axle shaft hollow, and forming the base section continuous with the head section thicker than other sections of the axle shaft.

The head section of the axle shaft is arranged on the chain side of the vehicle, and is made sequentially thinner from the head section to the base section, to the shaft section, therefore, manufacture of the axle shaft is simple.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5(*c*) illustrates the operation of the rear wheel support device 70 according to an embodiment of the present invention.

DETAILED DESCRIPTION OF THE PREFERRED EMBODIMENTS

Figure 1:
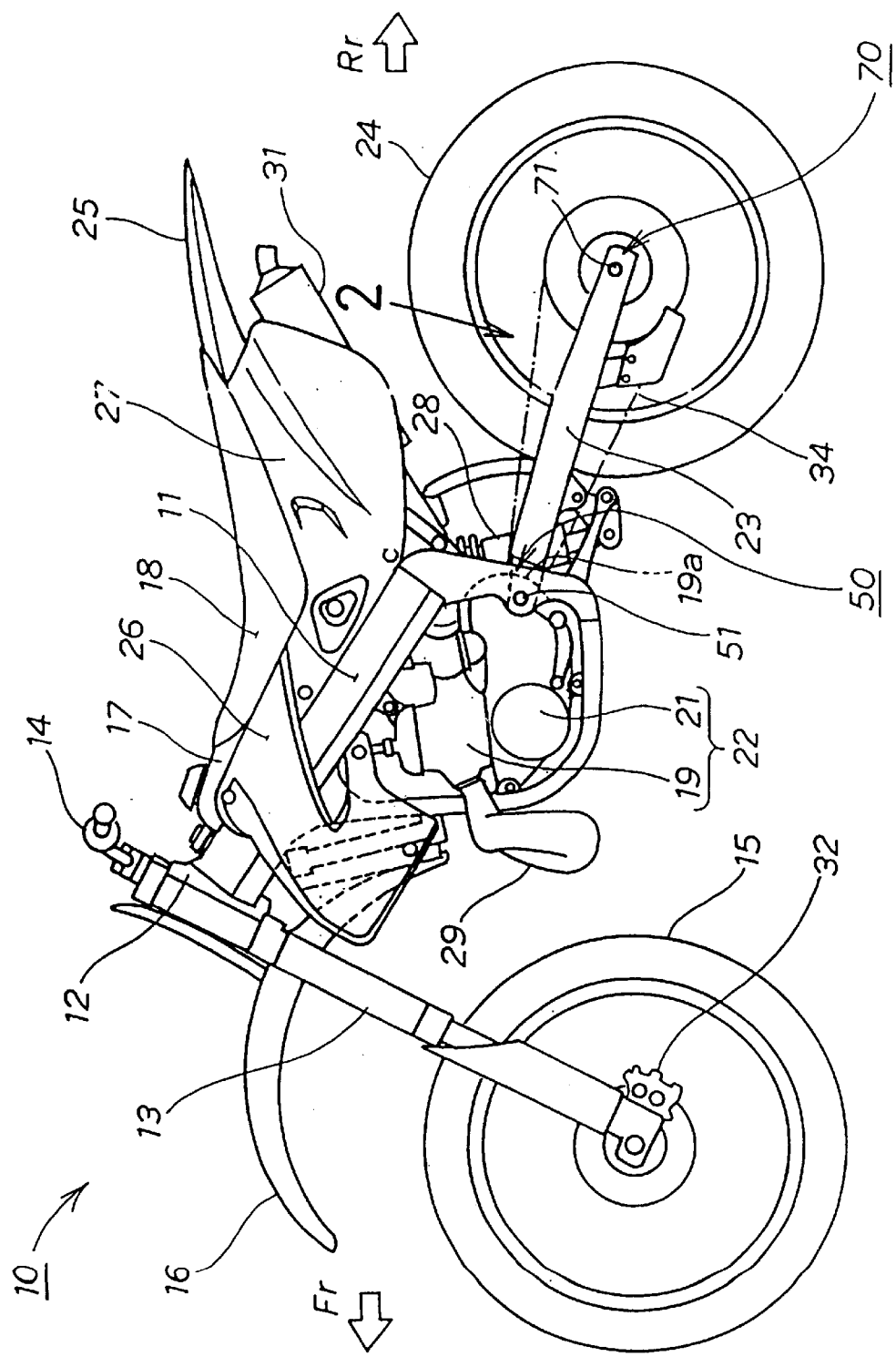
FIG. 1 is a side elevation of a motorcycle mounted with a rear wheel support device according to an embodiment of present invention.

FIG. 1 illustrates a side elevation of a motorcycle 10 mounted with a rear wheel support device according to an embodiment of present invention. The motorcycle 10, which is an off-road style bike (shown as an example only), includes a vehicle frame 11, a head pipe 12 provided at a front section of the vehicle frame 11, a front fork 13 attached to the head pipe 12 so as to be capable of rotation, a handle bar 14 attached to upper sections of the front fork 13, a front wheel 15 attached to a lower section of the front fork 13 so as to be capable of rotation, a front fender 16 covering the front wheel 15, a fuel tank 17 attached to the vehicle frame behind the head pipe 12, a seat 18 provided behind the fuel tank 17, a power unit 22 constituted by an engine 19, arranged below the seat 18 and the fuel tank 17, a transmission 21, a swingarm 23 swingably attached to the vehicle frame 11, behind the power unit 22, a rear wheel 24 attached to the swingarm 23 so as to be capable of rotation, and driven by the power unit 22, and a rear fender 25 provided above the rear wheel 24.

Reference 19*a* represents a crankcase of the engine 19, reference numeral 26 represents a radiator shroud, reference numeral 28 represents a rear suspension, reference numeral 29 represents an exhaust pipe, reference numeral 31 represents a silencer/muffler, reference numeral 32 represents a caliper, reference numeral 34 represents a chain (drive chain), reference numeral 50 represents a swingarm support structure for supporting the swingarm 23 at the vehicle frame 11 side, and reference numeral 70 represents a rear wheel support device for supporting the rear wheel 24 on the swingarm 23.

Figure 2:
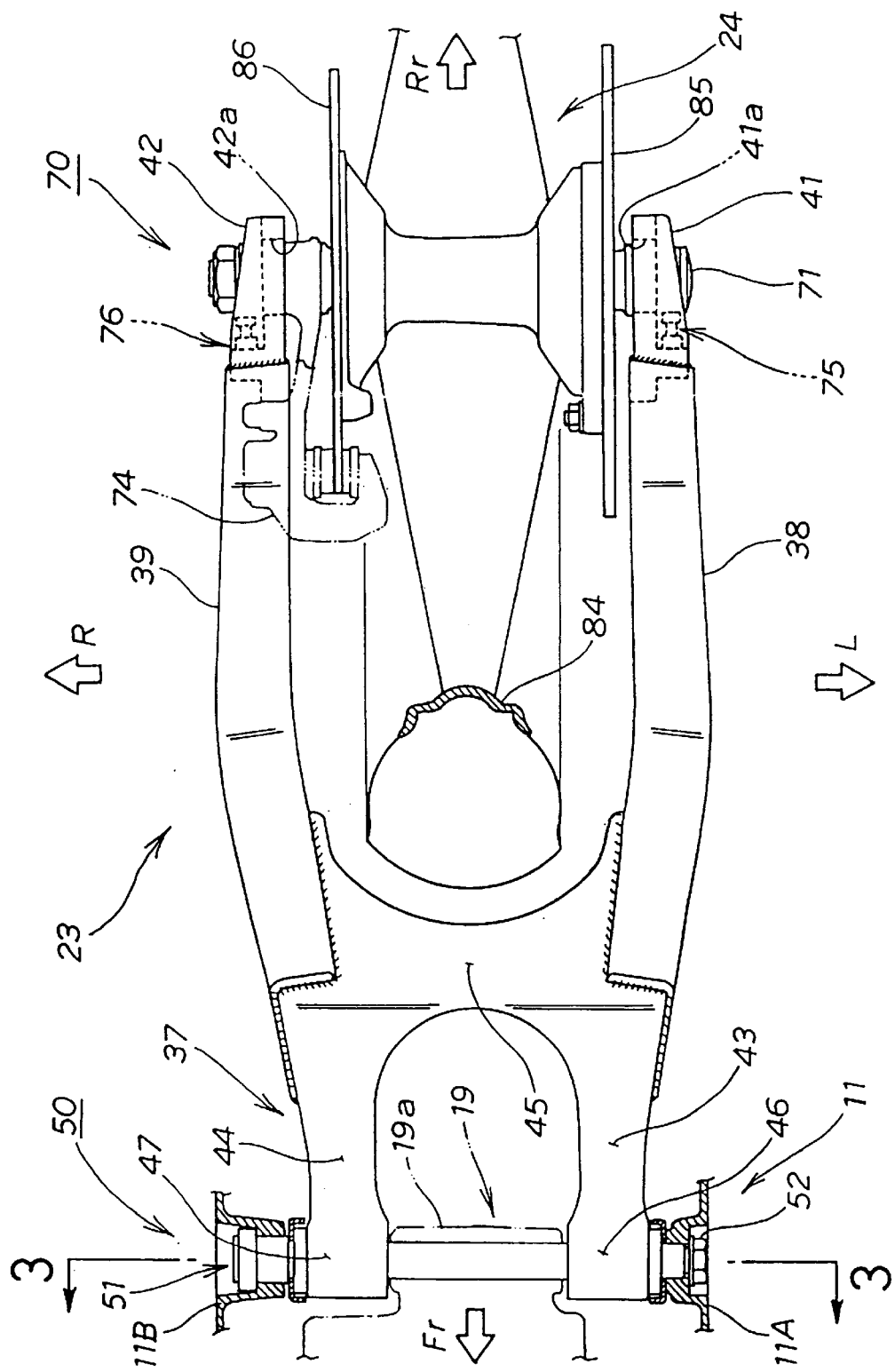
FIG. 2 is a perspective view of the swingarm illustrated in FIG. 1.

Referring now to FIG. 2, which is a perspective view of the swingarm 23 illustrated in FIG. 1, the swingarm 23 is made by attaching left and right fork pipes 38 and 39, thereof, to a substantially H-shaped arm base section 37. The left and right fork pipes 38 and 39 have integrated therewith left and right axle attachment sections 41 and 42, respectively. The arm base section 37 is formed by integrating left and right arms 43 and 44 with a connecting arm 45. Engagement sections 46 and 47 are integral with the left and right arms 43 and 44, respectively. The left and right engagement sections 46 and 47 are for engaging respective vehicle frame 11 left and right pivot support sections 11A and 11B at the front ends of the left and right arms 43 and 44.

The left axle attachment section 41, has an elongated hole 41a which the axle shaft 71 is slid through, and has a left slide adjuster mechanism 75 for allowing sliding movement of the axle shaft 71. The right axle attachment section 42 has substantially the same structure as the left axle attachment section 41, with reference numeral 42a being an elongated hole and reference numeral 76 being a right slide adjuster mechanism. The left and right slide adjuster mechanisms will be described in detail using FIG. 4.

Figure 3:
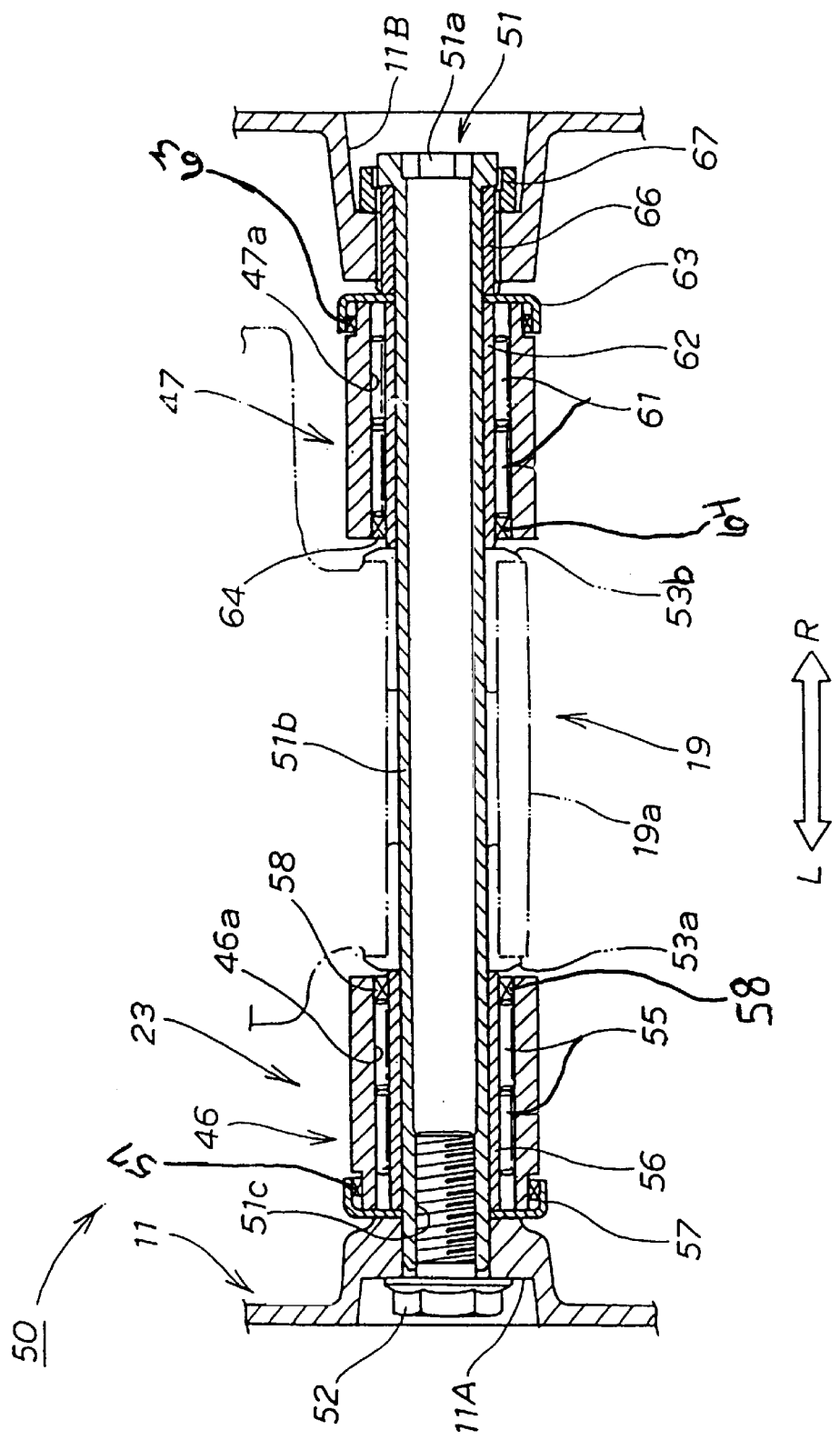
FIG. 3 is a cross sectional view of the swingarm taken along line 3—3 in FIG. 2.

FIG. 3 is a cross sectional drawing taken along line 3—3 of FIG. 2, illustrating a side cross section view of the swingarm support structure according to an embodiment of the present invention. The swingarm support structure 50 includes the left engagement section 46 of the swingarm 23, a crankcase 19a of the engine 19, and the right engagement section 47 of the swingarm 23, arranged in this order between left and right pivot support sections 11A and 11B of the vehicle frame 11. The pivot shaft 51 is passed through the left and right engagement sections 46 and 47 and through the left and right pivot support sections 11A and 11B, and is securely fastened with a bolt 52. Reference numerals 53a and 53b are collars of the crankcase 19a.

The left engagement section 46 has the pivot shaft 51 engaged in an engagement hole 46a via bearings 55 and a collar 56, and is provided with a cupped dust seals 57 on its outer side, and a dust seals 58 on its inner side.

The right engagement section 47 is symmetrical to the left engagement section 46. That is, reference numeral 47a is an engagement hole, reference numeral 61 are bearings, reference numeral 62 is a collar, reference numeral 63 are a cupped dust seals, and reference numeral 64 are a dust seals.

The pivot shaft 51 is formed as a shaft section 51b continuing on from a head section 51a, with the shaft section 51b being hollow and a threaded section being formed in the tip end of the shaft section 51b. In order to adjust for variations in the overall dimension of the left engagement section 46, the crankcase 19a of the engine 19, and the right engagement section 47, a gap adjusting screw 66 is adjustably screwed into the right pivot support section 11B and provided with a lock nut 67, thereby allowing for gap adjustment.

Figure 4:
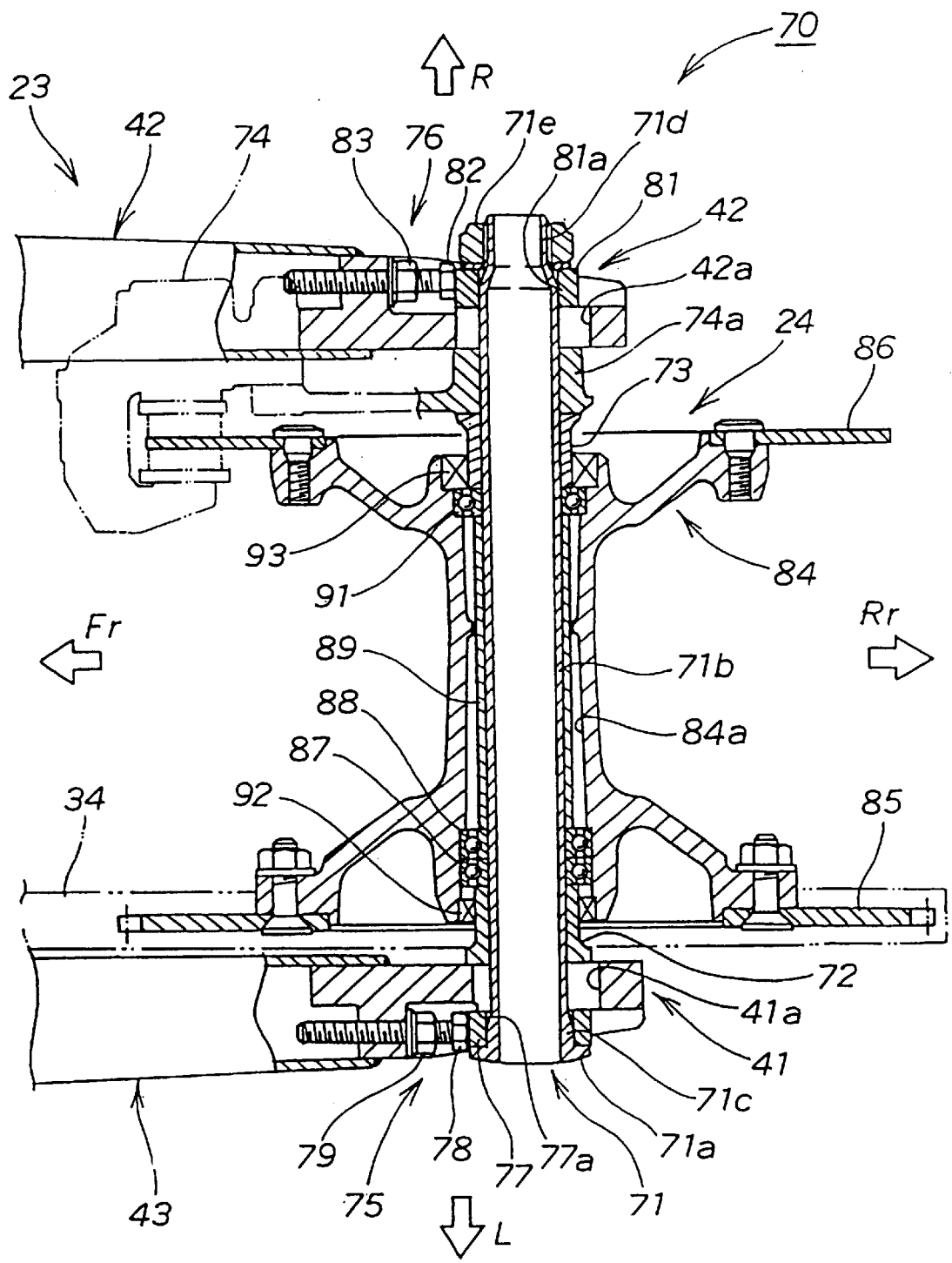
FIG. 4 is a plan cross sectional view of a rear wheel support device according to an embodiment of the present invention.

FIG. 4 is a plan cross sectional view of a rear wheel support device of an embodiment of the present invention. The rear wheel support device 70 has a rear wheel 24 suspended between left and right axle attachment sections 41 and 42 of the swingarm 23, via an axle shaft 71. Reference numeral 72 is a left wheel collar, reference numeral 73 is a right wheel collar, reference numeral 74 is a brake caliper and reference numeral 74a is a caliper bracket.

The axle shaft 71 has a head section 71a arranged at a drive chain 34 side of the motorcycle 10, a hollow shaft section 71b as a shaft, with the thickness of a base section 71c continuous to the head section 71a, being made thicker than the shaft section 71b, and a threaded section 71d being formed in the tip end of the axle shaft 71. The axle shaft 71 is slidably supported in respective elongated holes 41a and 42a of the left and right axle attachment sections 41 and 42, and by left and right slide adjuster mechanisms 75 and 76. Reference numeral 71e is a nut screwed into the threaded section 7d.

The left slide adjuster mechanism 75 has a left adjust collar 77 through which the axle shaft 71 passes, and is provided with a movement screw 78 for moving the left adjust collar 77. A lock nut 79 is attached to the movement screw 78. When the lock nut 79 is tightened, the movement of the axle shaft 71 in the longitudinal direction and tension of the drive chain 34 are adjusted by rotation of the movement screw 78 actuated by the tightening action. Reference numeral 77a represents an inner surface of the adjust collar 77.

The right slide adjuster mechanism 76 has substantially the identical structure to that of the left slide adjuster mechanism 75, with reference numeral 81 being a right adjust collar, reference numeral 81a being an inner surface of the right adjust collar, reference numeral 82 being a movement screw and reference numeral 83 being a lock nut. However, the inner surface 77a of the left adjust collar 77 has a larger diameter than the inner surface 81a of the right adjust collar 81.

The base section 71c of the axle shaft 71 comes into contact with only the inner surface 77a of the left adjust collar 77. Therefore, if the axle shaft 71 must be replaced, and the thickness of the base section 71c and the thickness of the shaft section 71b are the same, it is only necessary to change the inner diameter of the adjust collar 77, which means essentially the same components of the rear wheel support device 70 may be used for products with structural differences.

The wheel hub 84 of the rear wheel 24 has a sprocket 85 attached to the left side thereof, and a brake disc 86 attached to the right side thereof. Moreover, the wheel hub 84 has an axle hole 84a provided in its center. A bearing 87, a bearing 88, a collar 89 and a bearing 91 are interposed in this order from the left to the right of the wheel hub 84, between the axle hole 84a and the axle shaft 71, to rotatably attach the wheel hub 84 to the axle shaft 71. Reference numeral 92 is a left dust seal and reference number 93 is a right dust seal.

The operation of the above described rear wheel support device will now be described.

Figure 5A:
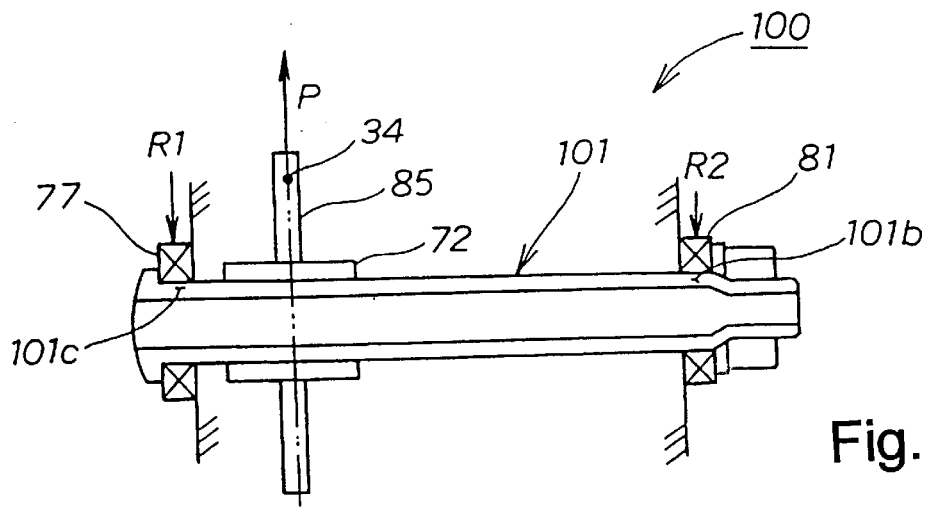
FIGS. 5(*a*)–5(*b*) are drawings illustrating the operation of the rear wheel support device according to the conventional art.
Figure 5B:
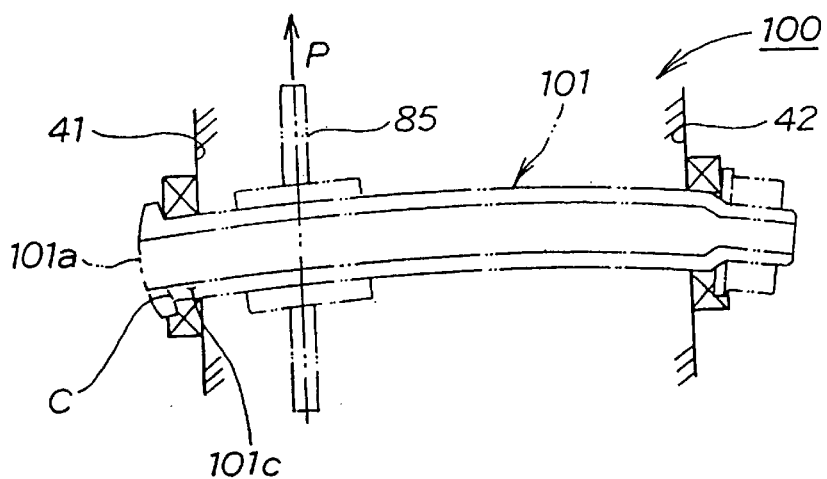
Figure 5C:
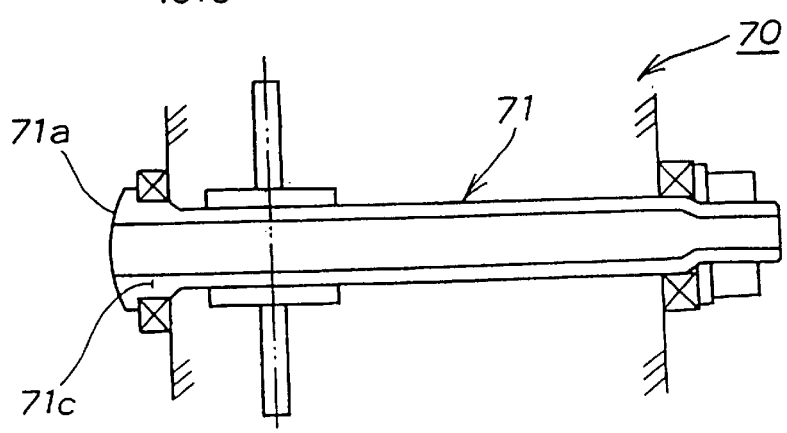

FIGS. 5(a) and 5(b) are drawings illustrating the operation of a rear wheel support device according to the conventional art. Illustrated in these figures are a rear wheel support device 100 and an axle shaft 101 of the conventional art. FIG. 5(c) illustrates the rear wheel support device 70 according to an embodiment of the present invention.

As illustrated in FIG. 5(a), if a sprocket 85 is driven by a drive chain 34, a load P acts on a left wheel collar 72 of the axle shaft 101. This load P causes drag RI in a left adjust collar 77 and drag R2 in a right adjust collar 81. The drag RI acts as a shearing force on a base section 101c of the axle shaft 101, which comes into contact with the left adjust collar 77, while the drag R2 acts as a shearing force on the tip end of the shaft section 101b, which comes into contact with the right adjust collar 81. The base section 101c of the axle shaft 101 has the same diameter as the shaft section 101b.

Generally speaking, the sprocket 85 is attached to the left adjust collar 77 side, and the drag RI of the left adjust collar 77 is incredibly large compared to the drag R2 of the right adjust collar 81. Specifically, a large shearing force acts on the base section 101c of the axle shaft 101.

On the other hand, as shown in FIG. 5(b), if a load P is exerted on the sprocket 85, the axle shaft 101 is subjected to bending in the direction of the load P. This is shown by the two-dot chain line. A bending moment caused by the load P acts on the head section 101a of the axle shaft 101, and a tensile stress acts partially inwardly. That is, because of the tensile stress acting partially inwardly on the bent section being connected to the head section 101a and the base section 101c of the axle shaft 101, there is a danger of cracks occurring between the head section 101a and the base section 101c of the axle shaft 101.

As shown in FIG. 5(c), with an embodiment of the present invention, the outer diameter of the base section 71c of the axle shaft 71 is made large to increase the strength between the head section 71a and the base section 71c, thereby preventing cracking between the head section 71a the base section 71c.

As shown in FIG. 4, the outer diameter of the base section 71c is formed larger than the outer diameter of the shaft section 71b of the axle shaft 71. This is achieved by increasing the thickness of the base section 71c However, it is conceivable to achieve this effect by decreasing the inner diameter of the base section 71c so that it is smaller than the inner diameter of the shaft section 71b, to thereby effectively increase the thickness of the base section 71c.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wheel support structure for a vehicle, comprising:
   a swingarm operatively attached to the vehicle, said swingarm having two arm members and an adjuster member attached to each arm member, respectively;
   a hollow axle shaft connected to said swingarm at essentially a distal end thereof, said hallow axle shaft in contact with each adjuster member; and
   a wheel rotatably supported via said axle shaft, said wheel having a wheel hub through which said axle shaft passes,
      wherein said axle shaft is constituted by a head section and a base section, said head section having a cross-sectional thickness greater than a cross-sectional thickness of said base section, said head section is positioned on a chain side of the vehicle, said each adjuster member includes an adjust collar member through which said axle shaft passes, and said each adjuster member is adjustable using a moveable screw associated with said each adjuster member, each moveable screw being in contact with said adjust collar member of each adjuster member, respectively, whereby actuation of either of said each movable screw initiates movement of said axle shaft via a respective adjuster member.

2. The wheel support structure according to claim 1, wherein said axle shaft is tapered at one distal end thereof.

3. The wheel support structure according to claim 2, wherein said tapered end has threads formed thereon.

* * * * *